(12) United States Patent
Miyazawa

(10) Patent No.: US 7,886,153 B2
(45) Date of Patent: Feb. 8, 2011

(54) COMMUNICATION DEVICE AND COMMUNICATION SYSTEM

(75) Inventor: Masafumi Miyazawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1001 days.

(21) Appl. No.: 11/427,627

(22) Filed: Jun. 29, 2006

(65) Prior Publication Data

US 2007/0005980 A1 Jan. 4, 2007

(30) Foreign Application Priority Data

Jun. 30, 2005 (JP) ............... 2005-191955

(51) Int. Cl.
*H04L 9/00* (2006.01)
(52) U.S. Cl. .............. 713/176; 713/150; 713/175; 713/156; 713/191; 380/282; 380/285
(58) Field of Classification Search ............. 713/176, 713/150, 175, 156, 191; 380/282, 285
See application file for complete search history.

(56) References Cited

U.S. PATENT DOCUMENTS

| 6,839,841 | B1 | 1/2005 | Medvinsky et al. |
| 6,981,139 | B2 | 12/2005 | Enokida |
| 7,143,144 | B2 | 11/2006 | Kanai et al. |
| 2003/0105876 | A1 | 6/2003 | Angelo et al. |
| 2003/0163700 | A1* | 8/2003 | Paatero ............. 713/175 |
| 2003/0200437 | A1 | 10/2003 | Oishi |
| 2004/0205211 | A1 | 10/2004 | Takeda et al. |
| 2005/0005097 | A1 | 1/2005 | Murakawa |

FOREIGN PATENT DOCUMENTS

| JP | H11-008619 A | 1/1999 |
| JP | 2001-154988 A | 6/2001 |
| JP | 2002-053740 A | 2/2002 |
| JP | 2002-535740 A | 2/2002 |
| JP | 2002-305518 A | 10/2002 |
| JP | 2003318893 A | 11/2003 |
| JP | 2004007512 | 1/2004 |
| JP | 2004-248220 A | 9/2004 |
| JP | 2004-274521 A | 9/2004 |
| JP | 2005-006076 A | 1/2005 |

(Continued)

OTHER PUBLICATIONS

Translation of JP 2002-305518, 19 pages.*

(Continued)

*Primary Examiner*—Nasser Moazzami
*Assistant Examiner*—Lisa Lewis
(74) *Attorney, Agent, or Firm*—Baker Botts L.L.P.

(57) ABSTRACT

There is provided a communication system in which a public key certificate is easily updated when identification information is changed, while network traffic increase is prevented. A print server executes encryption communication using a public key certificate which attests that own public key corresponds to own identification information. Then, if the print server detects that the own identification information (IP address or host name) is to be changed, the own server certificate which attests that own public key corresponds to changed identification information is generated by an electronic signature using the CA private key in a server.

10 Claims, 14 Drawing Sheets

FOREIGN PATENT DOCUMENTS

Figure 1:
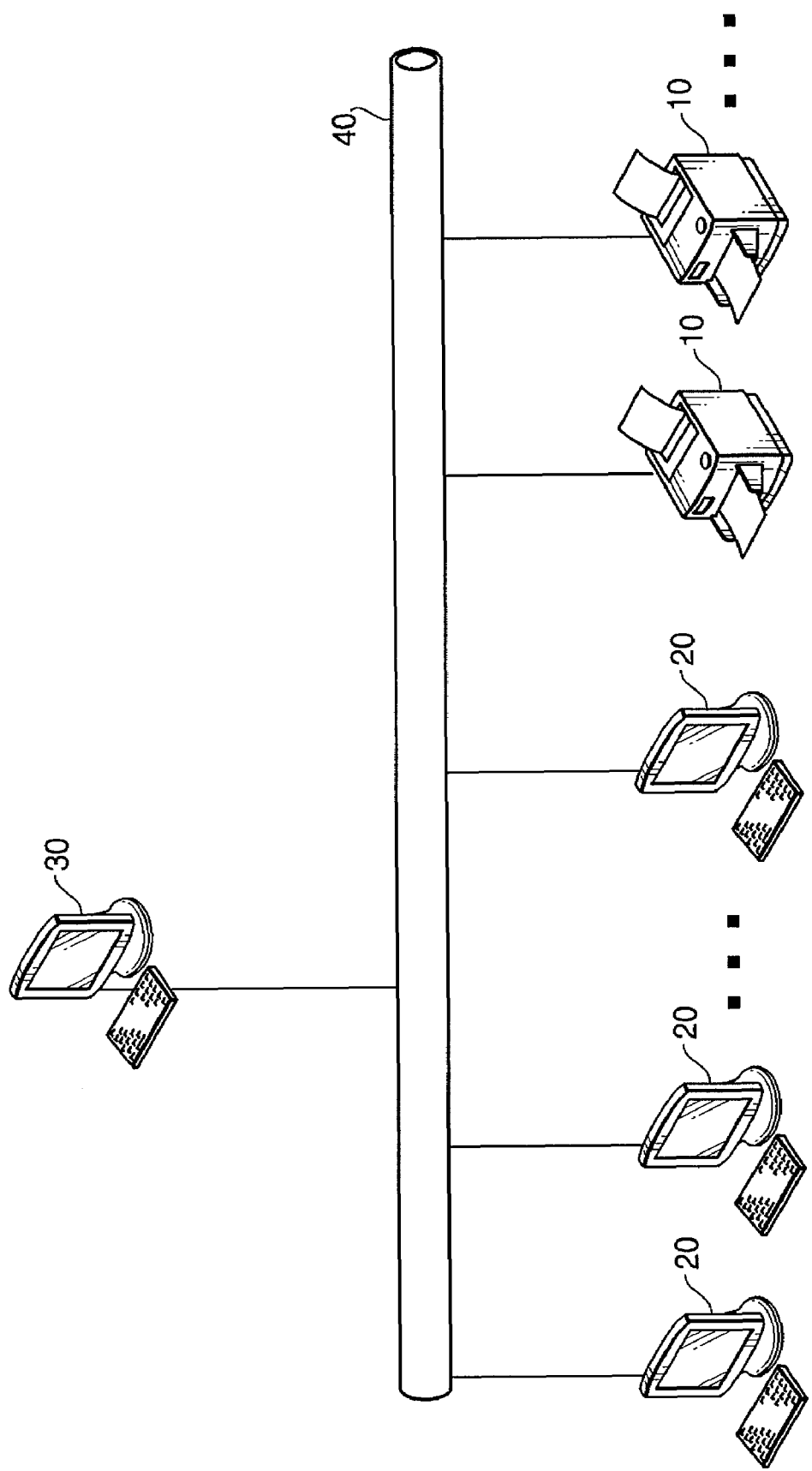

| | | |
|---|---|---|
| JP | 2005-039790 A | 2/2005 |
| WO | 2004044717 A1 | 5/2004 |

OTHER PUBLICATIONS

Japan Patent Office, Notification of Reasons of Rejection in Japanese Patent Application No. 2005-191955 (counterpart to the above-captioned U.S. Patent Application) mailed Feb. 24, 2009.

InKyoung Jeun et al., A Best Practice for Root CA Key Update in PKI, Applied Cryptography and Network Security, 278-291 (Jun. 8, 2004).

European Patent Office, European Search Report in European Patent Appl'n No. 06253403.7-1237 (counterpart to the above-captioned U.S. patent appl'n) mailed Oct. 24, 2006.

\* cited by examiner

EXAMPLE OF FORMAT OF CSR

Certificate Request:
  Data:
    Version: 0 (0x0)                                           — HOST NAME
    Subject: C=jp, ST=xxx, L=yyy, O =zzz, OU=www, CN=printer.xxx.net    HOLDER INFORMATION
    Subject Public Key Info:
      Public Key Algorithm: rsaEncryption
      RSA Public Key: (1024 bit)
        Modulus (1024 bit)
          00:ce:a3:21:53:ce:8f:f3:e9:2d:2e:1c:73:e4:75:
          af:a8:50:9a:c7:7b:91:0a:ce:63:80:22:b5:1b:fa:
          c6:8a:ea:22:8a:0b:f4:7d:5f:e1:00:74:90:05:87:
          20:99:eb:ab:1f:d6:92:3b:ff:42:25:4d:ce:4d:f9:      PUBLIC KEY
          51:cd:43:d2:8b:3a:4a:cb:71:71:52:84:ea:e9:b4:
          2b:79:c2:96:3d:86:b6:30:56:8e:48:24:25:50:48:
          3a:58:b6:25:77:38:24:df:79:45:8c:27:37:b7:26:
          be:54:ab:3f:8e:0e:48:43:9f:86:8f:8a:cd:a7:28:
          e8:f6:32:47:e7:84:1d:ef:fd
        Exponent: 65537 (0x10001)
    Attributes:
      a0:00                                                 EXTENDED AREA
Signature Algorithm: mb5WithRSAEncryption
  0f:99:0a:25:51:d9:ad:02:e0:ea:95:b5:59:0c:35:27:9f:01:
  ff:d9:6d:36:2b:d3:24:39:3b:64:c9:07:3c:e2:19:65:70:a0:
  e6:52:56:99:b8:1d:35:97:67:9d:d4:8f:47:55:2a:4a:ad:c2:
  3a:be:b7:4c:69:ee:3f:50:4c:eb:af:07:c0:43:35:5d:35:c1:   DIGITAL SIGNATURE
  8f:4a:65:ad:90:88:ab:d7:3f:eb:95:0a:9f:c0:32:5b:54:c9:   (BY PRIVATE KEY OF CA)
  f9:e8:c2:b7:8d:4e:bc:02:b5:2f:d7:1d:7c:1a:3b:42:ab:7e:
  b7:ec:71:bc:e8:fa:11:4e:45:cd:07:ba:fc:f7:03:6f:fc:00:
  7a:07

FIG. 9

COMMUNICATION DEVICE AND COMMUNICATION SYSTEM

CROSS-REFERENCE TO RELATED APPLICATIONS

This application claims priority under 35 U.S.C. §119 from Japanese Patent Application No. 2005-191955, filed on Jun. 30, 2005. The entire subject matter of the application is incorporated herein by reference.

BACKGROUND OF THE INVENTION

1. Technical Field

The present invention relates to a communication device which executes encryption communication using a public key certificate, a communication system including such a communication device, and a program used in such a communication system.

2. Description of Related Art

Recently, as network communication use have expanded drastically, it is critical to ensure the security in communication. Electronic signature and electronic authentication based on the technology of the public key infrastructure (PKI) have been widely used.

Electronic signature using public key method is generated by encrypting a hash value object data using a private key, so a public key corresponding to the private key is necessary to verify the electronic signature. Because the public key itself does not contain information of the key holder, a reliable third-party issues a public key certificate which attests that the public key contained in the certificate belongs to the person noted in the certificate. Here, the reliable third-party that issues a certificate is called a certificate authority (CA).

If the identification information contained the public key certificate is not identical with actual identification information because of a change of the identification information of the holder of the public key certificate (for example, IP address or host name), the public key certificate cannot be used. In this case, the communication device needs to request the CA for re-issuance of the public key certificate.

For example, a communication system that is configured so that IP address and public key certificate of a host which is a communication device in a LAN are frequently changed (for each communication partner, for each session, or for each communication packet transmission) is disclosed in Japanese Patent Application Provisional Publication No. P2004-7512A. In the communication system, a CA that issues a public key certificate is set as a node in the LAN, and host user name, password and public key are register in the CA. When the CA is requested by the host to issue a public key certificate, by verifying the host based on information registered in the CA, host spoofing is prevented.

However, in the configuration disclosed in Japanese Patent Application Provisional Publication No. P2004-7512A, frequent updates of the public key certificates causes network traffic increase because of public key certificate issuance.

SUMMARY OF THE INVENTION

Aspects of the invention are advantageous in that there are provided a communication device a communication system in which a public key certificate is updated while preventing network traffic increase if the identification information is changed

BRIEF DESCRIPTION OF THE ACCOMPANYING DRAWINGS

Figure 2:
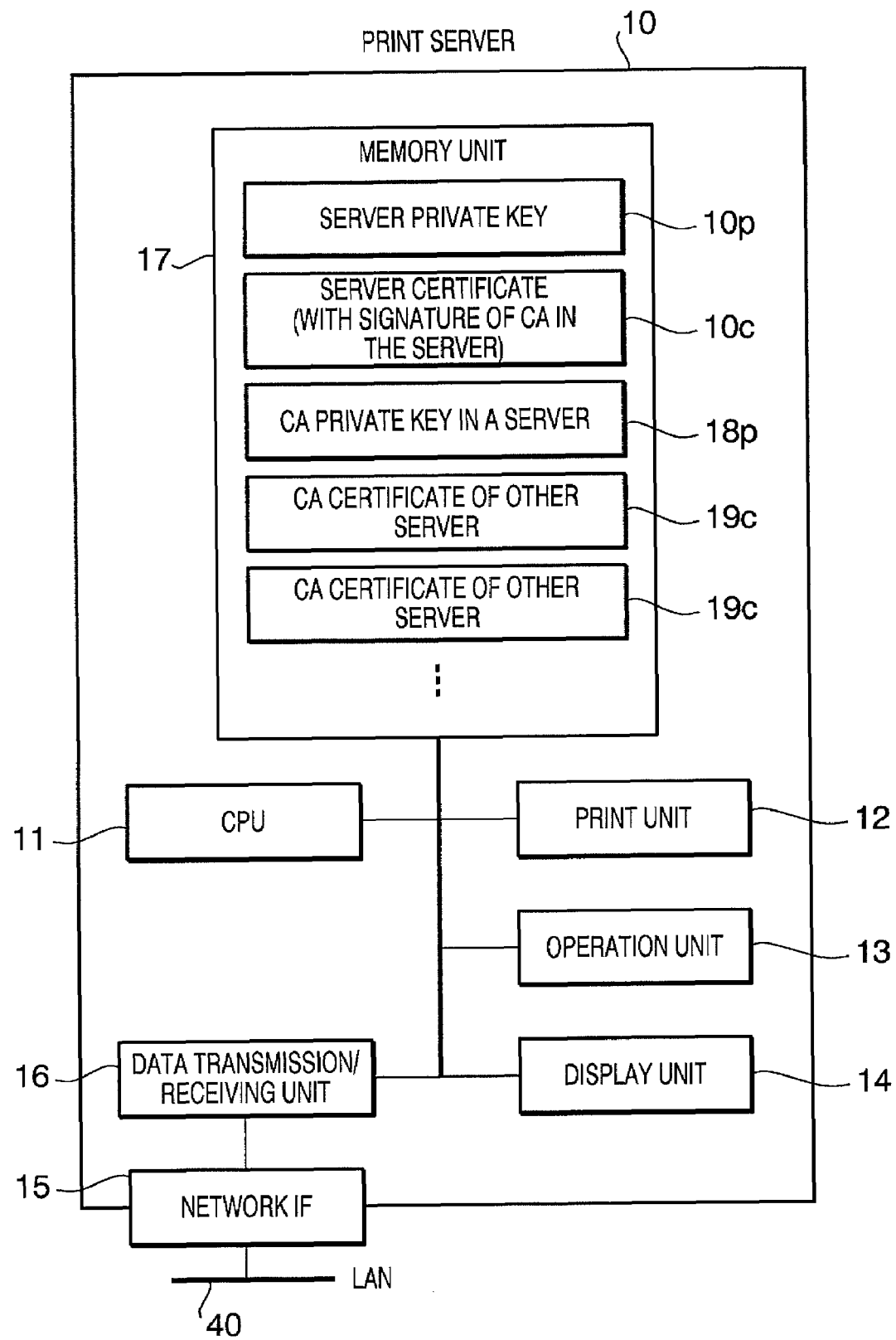
Figure 3:
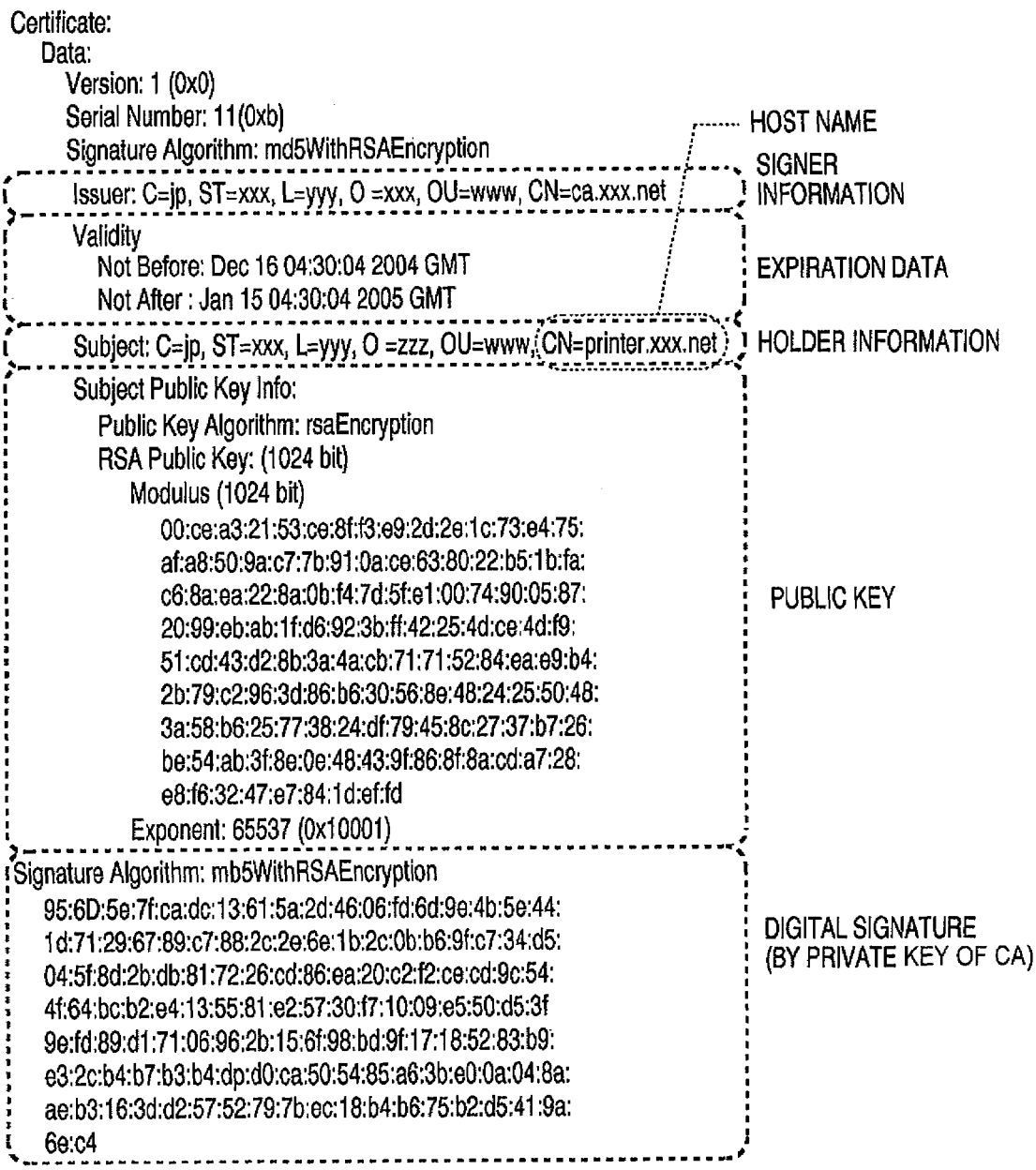
Figure 4:
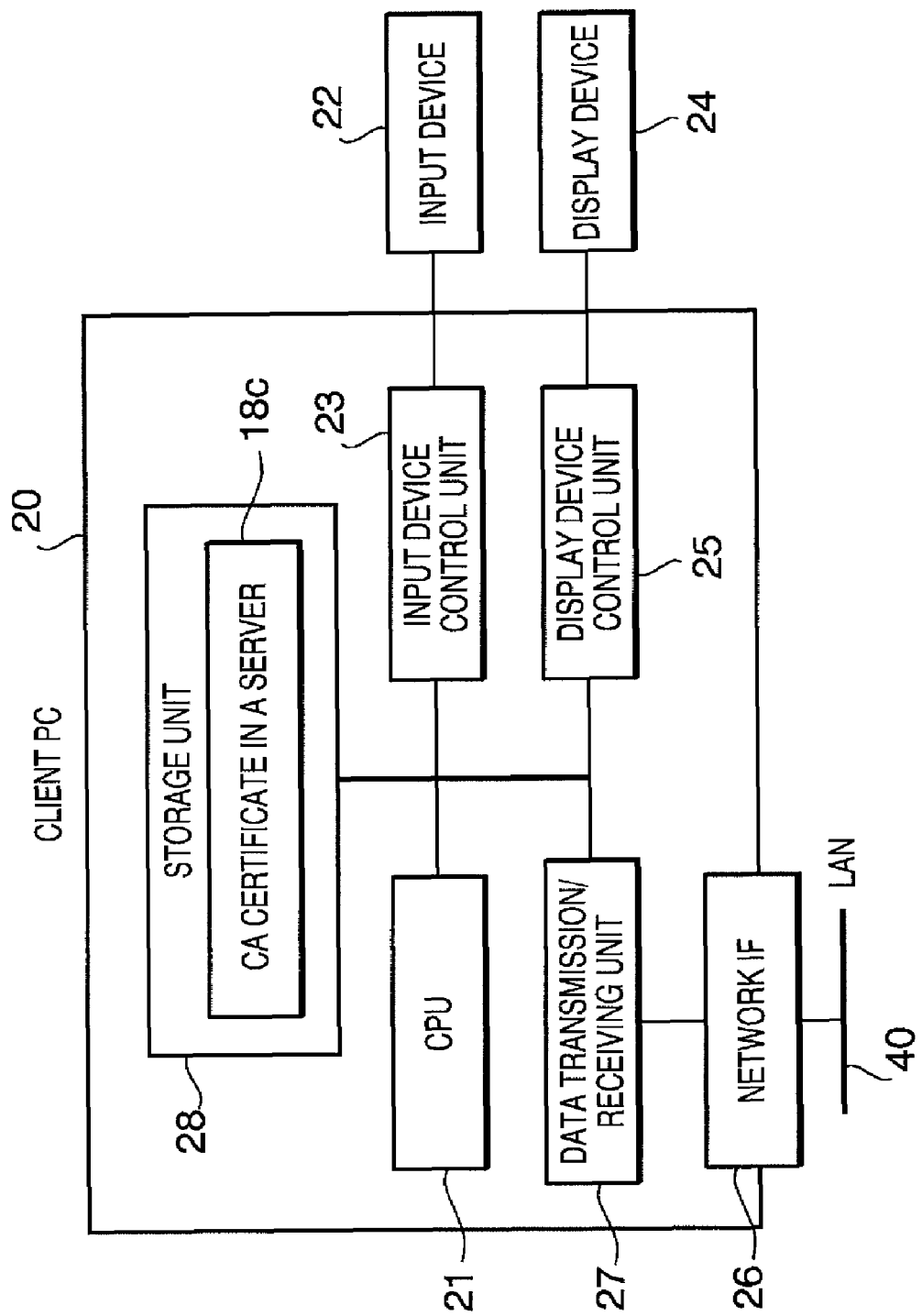
Figure 5:
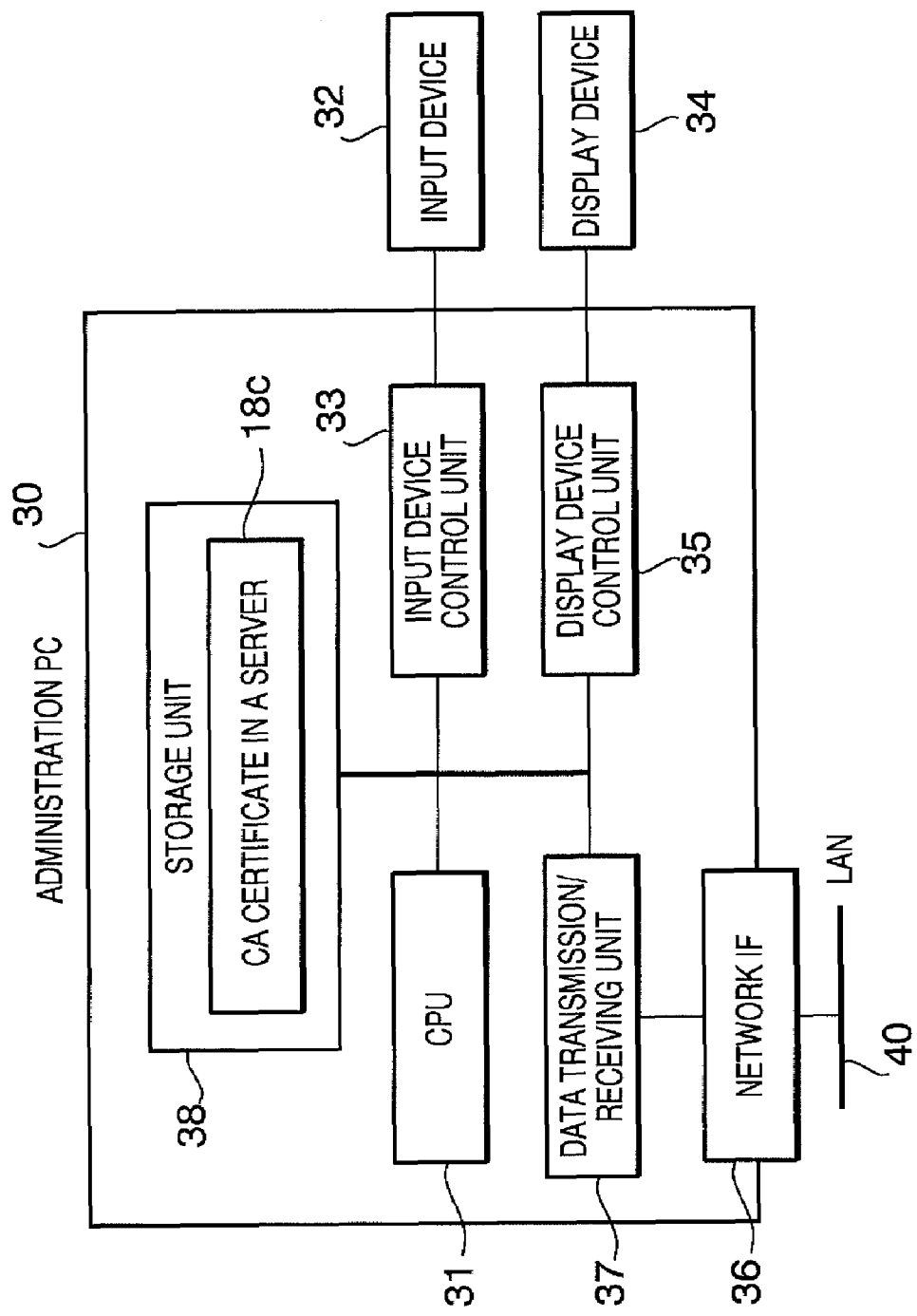
Figure 6:
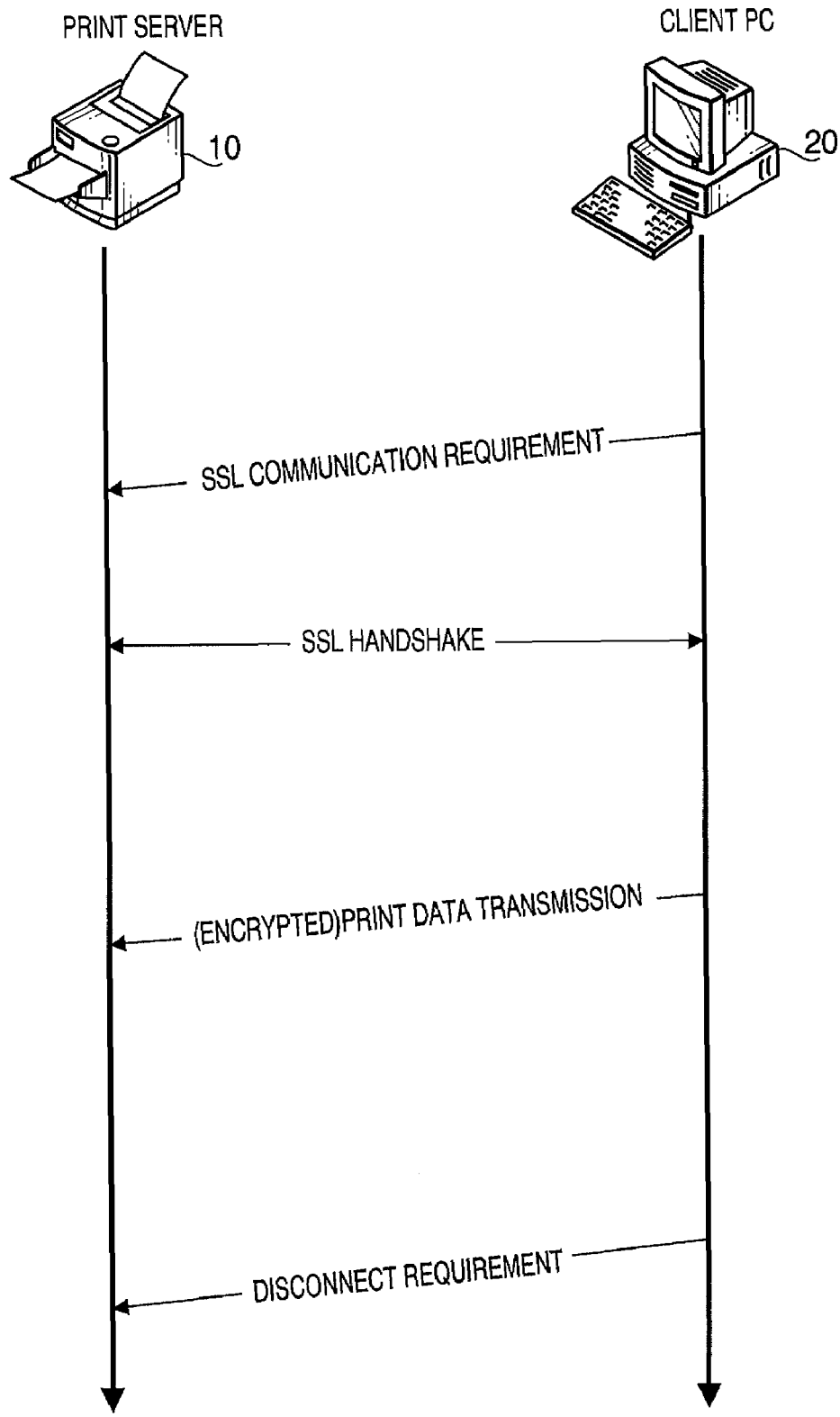
Figure 7:
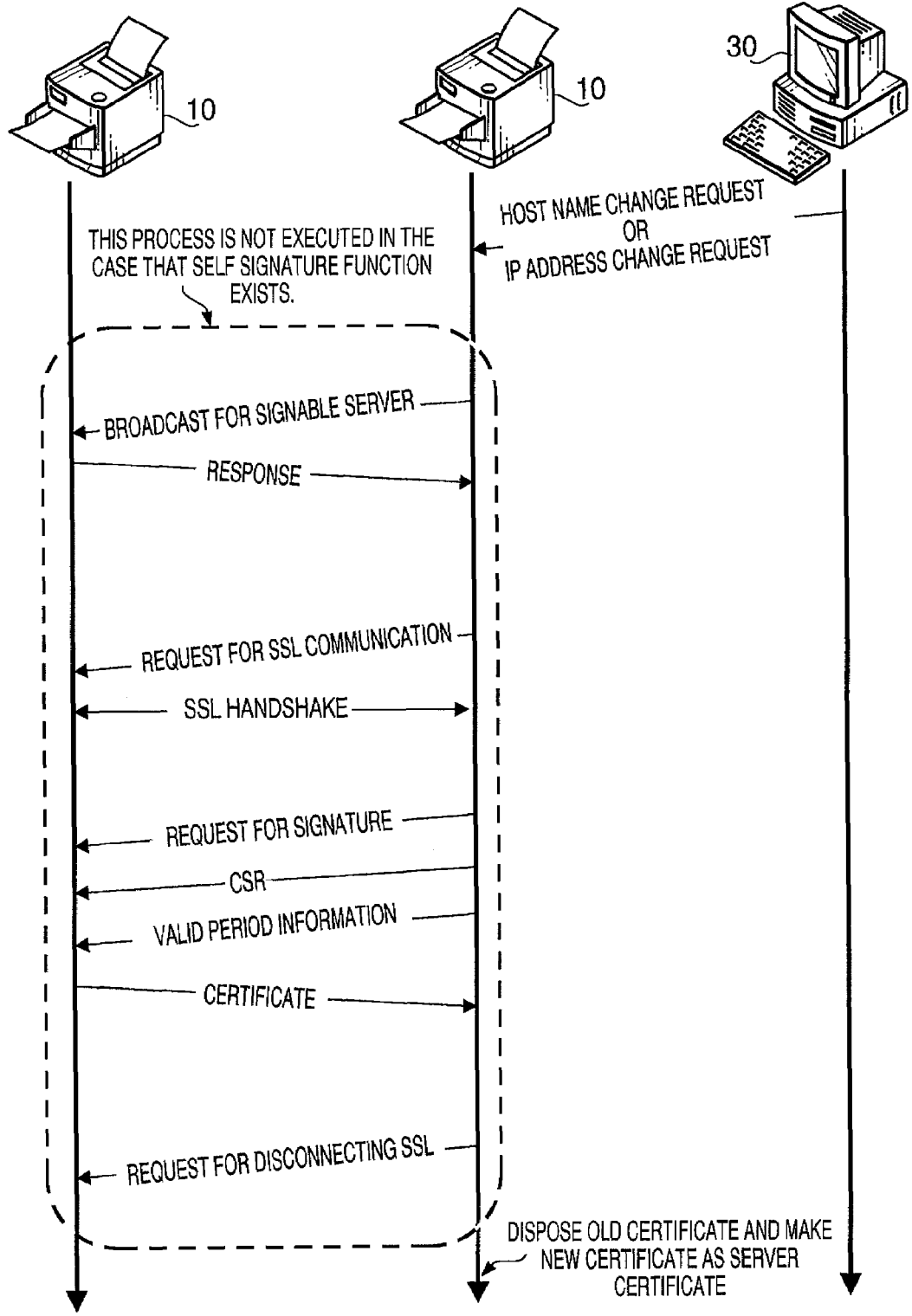
Figure 8:
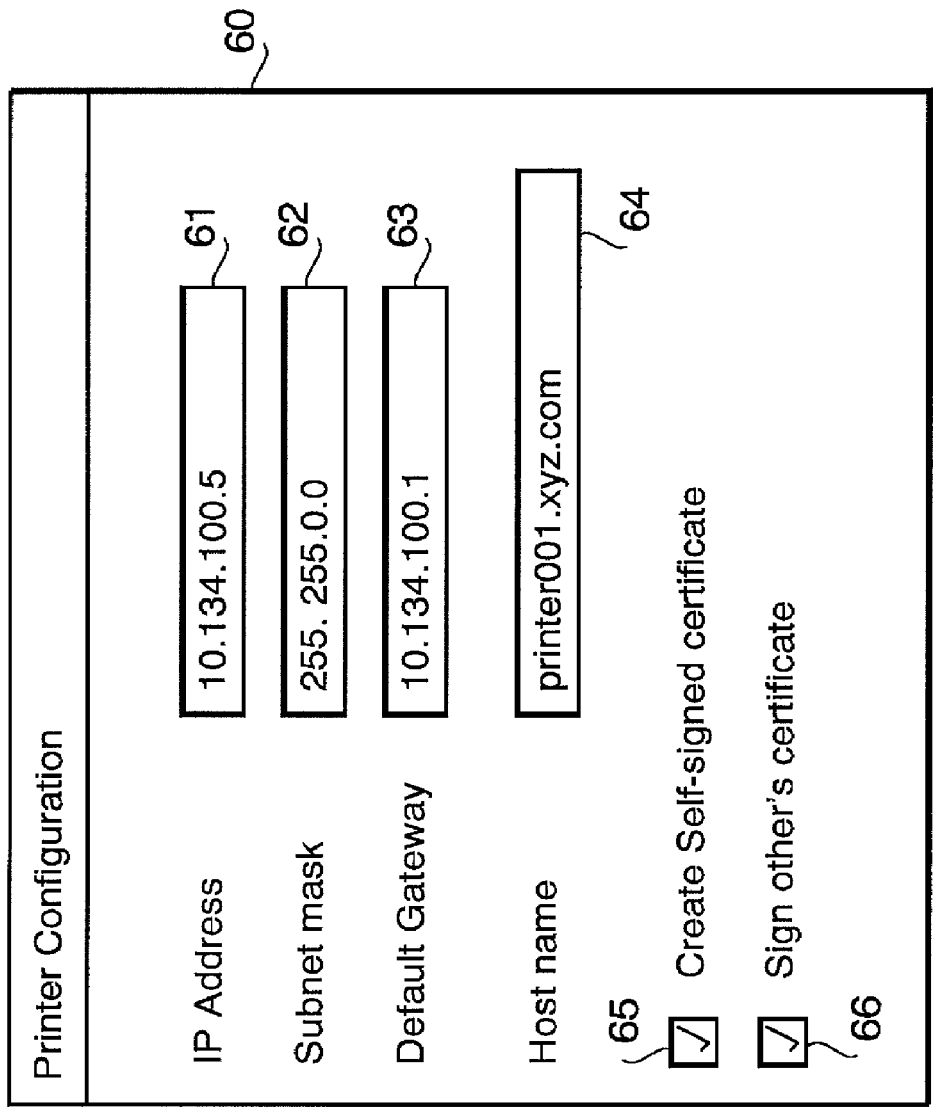
Figure 10:
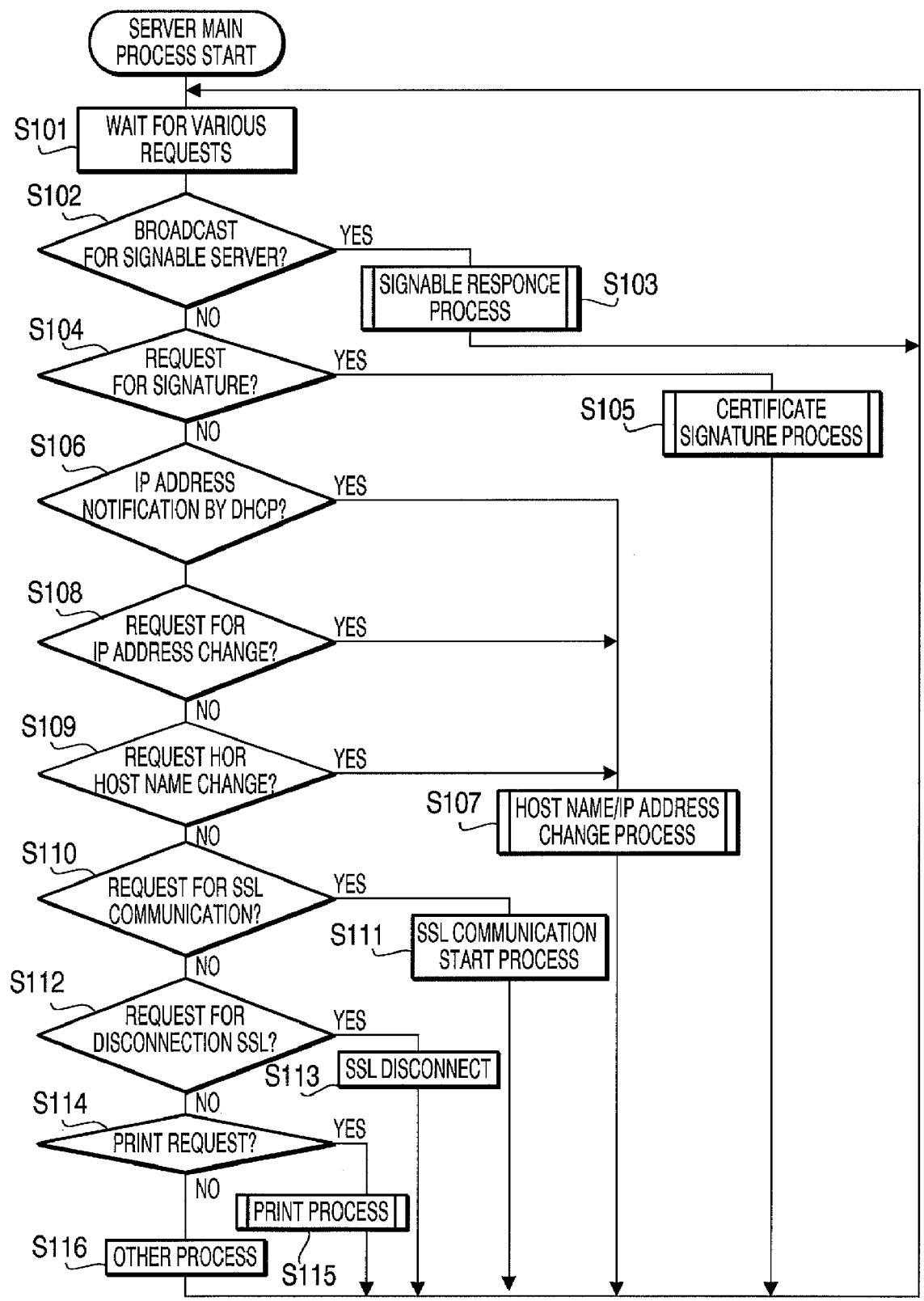
Figure 11:
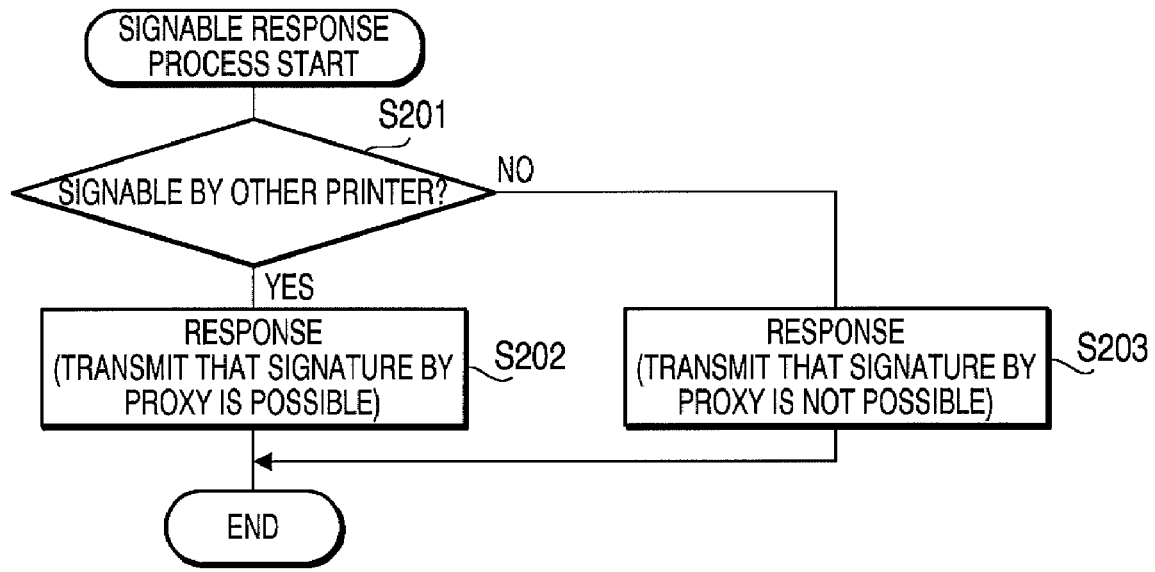
Figure 12:
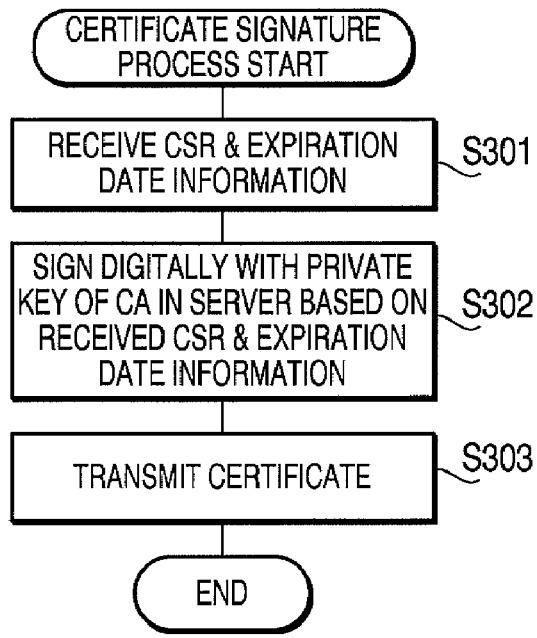
Figure 13:
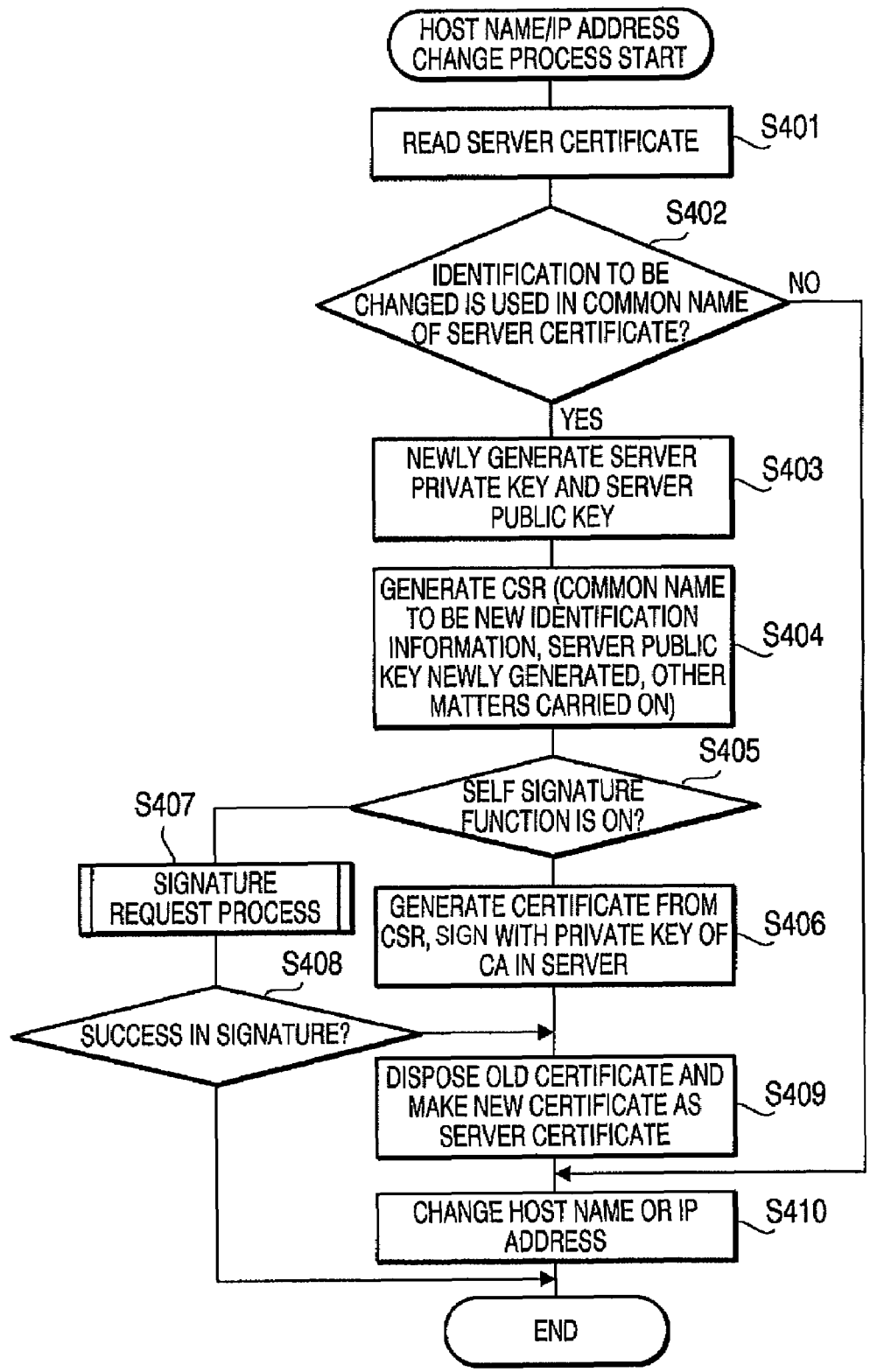
Figure 14:
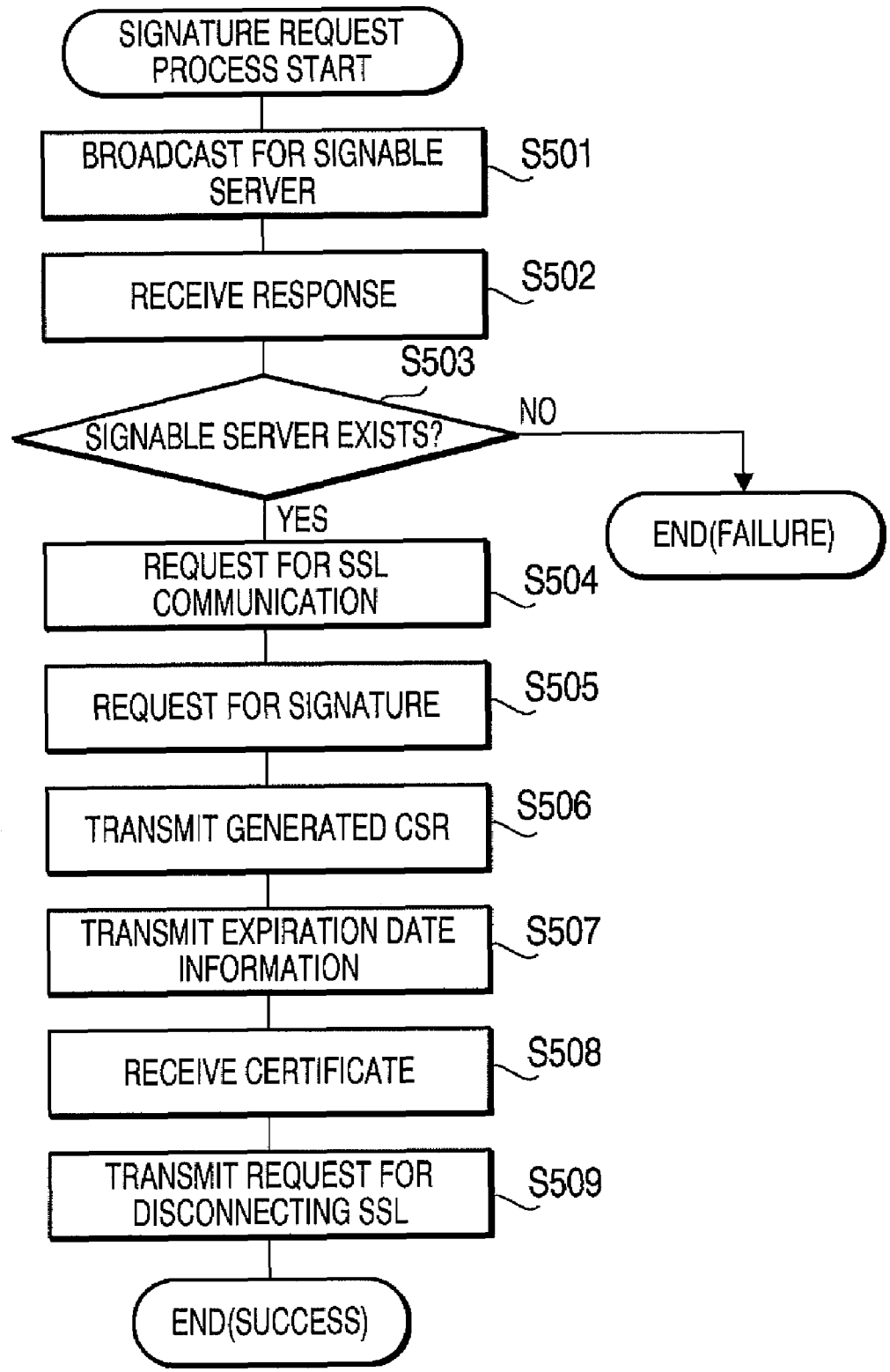
Figure 15:
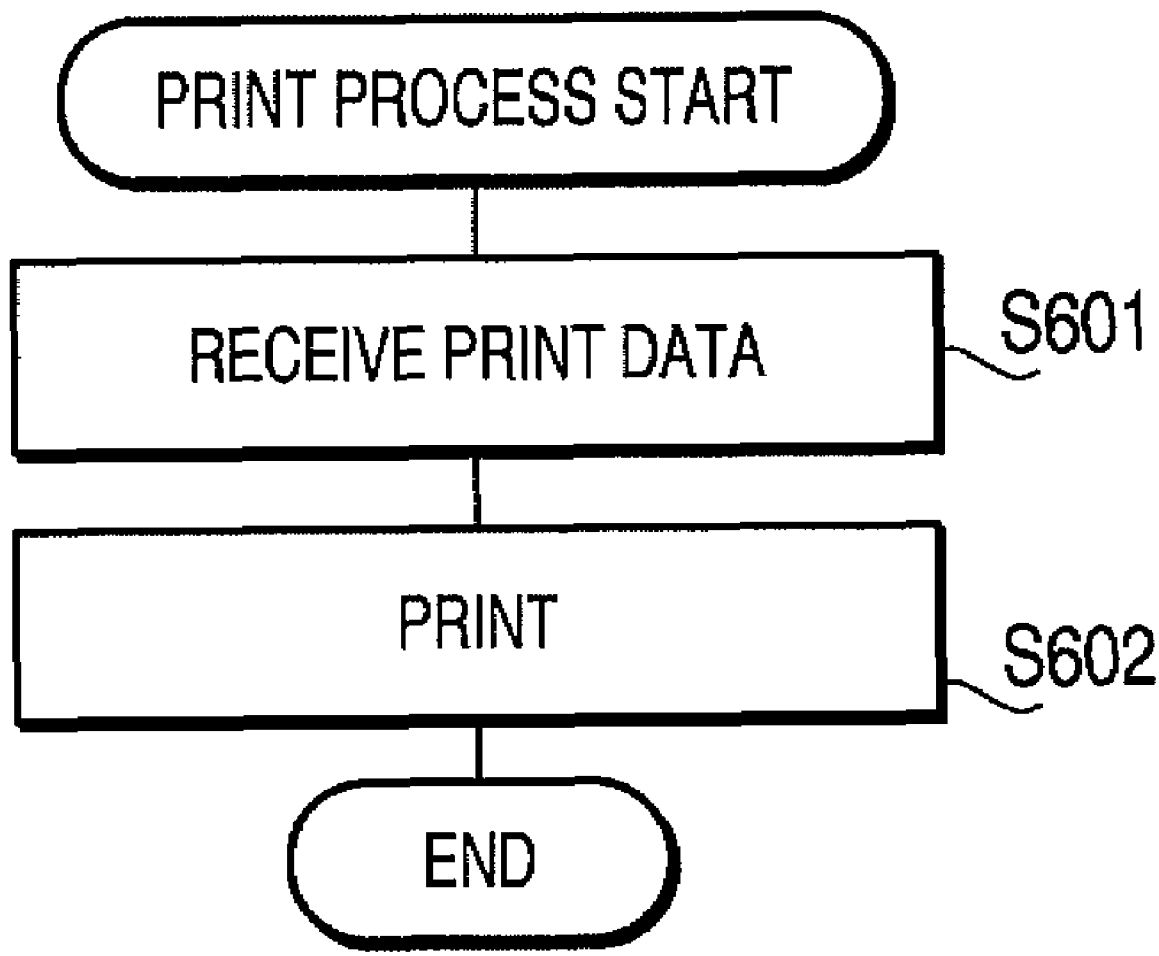

FIG. 1 shows configuration of a network print system.
FIG. 2 is a block diagram which shows configuration of the print server.
FIG. 3 is an illustration which shows a format example of the public key certificate.
FIG. 4 is a block diagram which shows configuration of the client PC.
FIG. 5 is a block diagram which shows configuration of the administration PC.
FIG. 6 is a ladder chart which shows an outline of communication between the print server and the client PC when the client PC transmits print data to the print server to print the data.
FIG. 7 is a ladder chart which shows an outline of communication between the print server and the administration PC, when identification information of the print server 10 in the LAN is changed.
FIG. 8 is an illustration which shows the setup screen displayed on the display device of the administration PC.
FIG. 9 is an illustration which shows a format example of CSR.
FIG. 10 is a flow diagram which shows the server main process.
FIG. 11 is a flow diagram which shows the signable response process.
FIG. 12 is a flow diagram which shows the certificate signature process.
FIG. 13 is a flow diagram which shows the host name/IP address change process.
FIG. 14 is a flow diagram which shows the signature request process.
FIG. 15 is a flow diagram which shows the print process.

DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to aspects of the invention, there is provided a communication device which executes encryption communication using a public key certificate which attests that own public key corresponds to own identification information (for example, IP address or host name). The communication device comprises a detect unit that detects a change of the identification information. When the detect unit detects a change of the identification information, the communication device generates a public key certificate which attests that own public key corresponds to the changed identification information with electronic signature using other private key than a private key corresponding to the public key.

That is, the communication device has a function as a CA to generate a public key certificate, and issues the device's own public key certificate using other private key than the own (a private key as the CA).

Therefore, by using the communication device, the public key certificate can be updated within the communication device in the case that the identification information is changed. As a result, network traffic can be reduced compared to the configuration that the issuance of the public key certificate is requested outside.

It is possible that the device's own public key certificate Dc is configured to be generated by an electronic signature using the device's own private key Dp instead of using a private key Cp as a CA. However, in the configuration, the own public key certificate for verify of the electronic signature has be updated every time the own identification information is changed. That is, in order to verify the public key certificate Dc of the communication device according to aspects of the invention, the communication partner device which has encryption communication with the device according to aspects of the invention has to obtain the signer's public key certificate for verifying the public key certificate Dc securely and stores the signer's certificate beforehand. Therefore, in the configuration that the own public certificate Dc is generated with the electronic signature using the own private key Dp, the same own public key certificate De is used to verify the electronic signature of the public key certificate Dc. The communication partner device has to not only obtain the public key certificate Dc for verifying the electronic signature securely beforehand, but also update the public key certificate Dc every time the public key certificate Dc is revoked because the identification information of the communication device according aspects of the invention is changed. On the other hand, in the configuration according to aspects of the invention that the own public certificate Dc is generated with the electronic signature using the private key Cp of as a CA which is different from the own private key Dp, the public key certificate Cc of as a CA is used to verify the electronic signature of the public key certificate Dc. Therefore, even if the public key certificate Dc is revoked because the identification information of the communication device according aspects of the invention is changed, the public key certificate Cc is possible to be used continuously without any updating.

Optionally, the communication device according to aspects of the invention may comprise a setup unit that prohibits setup so as to prohibit generation of the public key certificate by a user. Then, in the communication device according to aspects of the invention, a prohibit unit determines whether generation of the public key certificate is to be prohibited based on a setup by the setup unit. If it is determined that the generation is prohibited, the prohibit unit prohibits generation of a public key certificate by the certificate generate unit.

In the communication device configured in this way according to aspects of the invention, a user himself can determine whether a public key certificate update process due to identification information change is executed within the communication device. Therefore, the public key certificate generation may be set to be prohibited if the user does not want the public key certificate be updated automatically.

In the case that the public key certificate update process is set to be prohibited in the communication device, if identification information of the communication device is changed, it may be possible that the public key certificate cannot be used for a long time.

Then optionally, the communication device may have a request unit that requests outside for generation of a public key certificate which attests that own public key corresponds to changed identification information, if the detect unit detects a change of the identification information in the case that generation a public key certificate by the certificate generate unit is prohibited by the prohibit unit.

In the communication device configured in this way according to aspects of the invention, if the public key certificate update process is prohibited, the public key certificate generation is requested outside (for example, to the certificate authority). Therefore, the communication device according to aspects of the invention can prevent a situation where the public key certificate continues to be revoked due to the identification information change for a long time.

Further optionally, the communication device may have an authentication unit that generates a requested public key certificate when the authentication unit is requested to generate the public key certificate from outside. If the communication system is configured to comprise a plurality of the communication devices, it is possible that the communication devices mutually request for generating the public key certificates.

According to aspects of the invention, there is provided a communication system which comprises the communication device and a terminal device that stores the public key certificate generated by the certificate generate unit of the communication device and communicates with the communication device using the public key certificate. In the communication system, the same effects as described above may be achieved according to aspects of the invention.

According the aspects of the invention, there is provided a program which makes a computer which executes encryption communication using a public key certificate which attests that own public key corresponds to own identification information function as a detect unit that detects a change of the identification information, and a certificate generate unit that generates a public key certificate which attests that own public key corresponds to changed identification information with electronic signature using other private key than a private key corresponding to the public key when the detect unit detects a change of the identification information.

Therefore, by using the program according to aspects of the invention, the computer can function as the communication device, and the above described effect is achieved. In addition, a program may be computer software stored on computer-readable media including magnetic disk such as flexible disk, optical disk, semiconductor memory, etc.

EXAMPLES

Hereinafter, examples according to the invention will be described with reference to the accompanying drawings.

1. Overall Configuration of the System

FIG. 1 shows configuration of a network print system which is a communication system as an example of the present invention, As shown in FIG. 1, the network print system is configured so that a plurality of print servers 10, a plurality of client personal computers (hereinafter referred to "client PC 20"), a plurality of client personal computers (hereinafter referred to "client PC 30"), and a personal computer for administration (hereinafter referred to "administration PC 20") are connected to LAN 40, and communicatable with each other via LAN 40.

2. Configuration of Each Device

Hereinafter, configuration of each device of the network print system is described.

2.1 Configuration of a Print Server

FIG. 2 is a block diagram which shows configuration of the print server 10.

The print server 10 is a device which functions as so called a network printer which receives print data from the client PC 20 that is configured to be communicatable with the server via LAN 40, and prints an image represented by the print data. As shown in FIG. 2, the print server 10 is provided with a CPU 11, a print unit 12, an operation unit 13, a display unit 14, a network interface (network IF) 15, a data transmission/receiving unit 16 and a storage unit 17.

The CPU 11 controls each one of the units which configure the print server 10 by performing various arithmetic processing.

The print unit 12 prints image on record medium (print papers, etc.) based on commands from the CPU 11. Printing images on record medium is done with a recording method such as a laser transfer method or inkjet printing method.

The operation unit 13 comprises a operation panel as a user interface and receives the user's command through the operation panel. The display unit 14 is provided with a liquid crystal display, and displays various information to the user as visually recognizable images.

The network interface 15 transmits and receives data through a communication cable (LAN cable) which is connected to the interface. The data transmission/receiving unit 16 transmits data output from the CPU 11 via the network interface 15, and outputs data received via the network interface 15 to the CPU 11.

The storage unit 17 is to store various information, and is configured with a ROM, a RAM, etc. The storage unit 17 stores a private key of the print server 10 (hereinafter referred to the "server private key 10p"), an electronic certificate to verify an identity of the print server 10 (hereinafter referred to the "server certificate 10c"). The server certificate 10c is a public key certificate which verifies that the server private key 10p corresponds to identification information, such as IP address a host name, FQDN (Fully Qualified Domain Name) of the print server 10. As shown in an example of format of the public key certificate in FIG. 3, the network print system uses the public key certificate containing signer information, validity period, holder information (common name), public key and electronic signature (digital signature). Here, an actual public key certificate is not text data. However, the certificate is shown as text data in FIG. 3 for convenience of explanation.

Each print server 10 in the network print system has a function as a CA. That is, the storage unit 17 stores a CA private key in a server 18p which is a private key of the CA of the print server 10 besides a server private key 10p, and generates a public key certificate with electronic signature using the CA private key in a server 18p.

In addition, the storage unit 17 of each print server 10 in the network print system stores CA certificates 19c of all of other print servers 10 which have a function as a CA.

Further, the storage unit 17 stores a program for making the CPU 11 execute various processes (FIG. 10-FIG. 15).

2.3 Configuration of a Client PC

FIG. 4 is a block diagram which shows configuration of the client PC 20.

The client PC 20 is a computer which is used by the user of the network print system (multipurpose personal computer in the example). As can be seen in FIG. 4, the client PC 20 comprises a CPU 21, an input device 22, an input device control unit 23, a display device 24, a display device control unit 25, a network interface (network IF) 26, a data transmission/receiving unit 27 and a storage unit 28.

The CPU 21 controls each one of the units which configure the client PC 20 by performing various arithmetic processing. The input device 22 is for input direction by the user's outside operation. As an input device 22, a key board and a pointing device (mouse, etc.) are used in the example.

The input device control unit 23 output signals representing various commands input through the device 22 by the user to the CPU 21. The display device 24 displays various information to the user as visually recognizable images. In the example, as a display device 24, a liquid crystal display is used.

The display device control unit 25 displays images represented by the data output form the CPU 21 on the display device 24. The network interface 15 transmits and receives data through a communication cable (LAN cable) which is connected to the interface.

The data transmission/receiving unit 27 transmits data output from the CPU 21 via the network interface 26, and outputs data received via the network interface 26 to the CPU 21.

The storage unit 28 is to store various information, and is configured with a ROM, a RAM, hard disk drive (HDD), etc. The storage unit 28 stores an electronic certificate to verify the identity of the CA of each print server 10 (hereinafter referred to the "CA certificate in a server 18c") securely beforehand. The CA certificate in a server 18c is a public key certificate which verifies that the public key of the CA corresponds to the CA. The CA certificate in a server 18c does not contain identification information (IP address, host name) of the print server 10, and even if the identification information of the print server 10 is changed, the CA certificate can be used print server 10 without change.

2.3 Configuration of Administration PC

FIG. 5 is a block diagram which shows configuration of the administration PC 30. The administration PC 30 is a computer which is used by an administrator of the network print system (multipurpose personal computer in the example). As can be seen in FIG. 5, the administration PC 30 comprises a CPU 31, an input device 32, an input device control unit 33, a display device 34, a display device control unit 35, a network interface (network IF) 36, an data transmission/receiving unit 37 and a storage unit 38. In addition, the hardware configuration of the administration PC 30 and the CA certificate in a server I Sc are also stored securely beforehand in the same way of the case of the client PC 20.

3. Outline of the Communication

Next, outline of the communication in the network print system is described.

3.1 Communication for Printing

FIG. 6 is a ladder chart which shows an outline of communication between the print server 10 and the client PC 20 when the client PC 20 transmits print data to the print server 10 to print the data.

As shown in the FIG. 6, firstly, the client PC 20 transmits a request for starting SSL (Secure Sockets Layer) communication to the print server 10. Thus, SSL handshake is executed between the client PC 20 and the print server 10. In the SSL handshake, the client PC 20 receives a server certificate 10c from the print server 10, a confirm process of the identity of the print server 10 by verifying an electronic signature of the server certificate 10c using the CA certificate in a server 18c of the server stored in the storage unit 28 (specifically, a public key of CA 40) is executed. A process of establishing the SSL connection is executed sharing a common key by an encryption communication using the server certificate 10c (in particular, the server public key).

Thus, while the SSL connection is established, the client PC 20 transmits encrypted print data to the print server 10 using the common key. On the other hand, the print server 10 decrypts the receives print data using the common key, and printout images represented by the print data with the print unit 12.

Then, after transmitting all of print data, the client PC 20 transmits the print server 10a SSL disconnect request which is requesting for terminating communication using SSL.

Herewith, the SSL connection between the client PC 20 and the print server 10 is disconnected.

3.2 Communication Identification Information Change of the Print Server

FIG. 7 is a ladder chart which shows an outline of communication between the print server 10 and the administration PC 30 and between the print server 10 and the other print server 10, when identification information (IP address, host name) of the print server 10 in the LAN 40 is changed.

The network print system is configured so that the one administration PC 30 totally manages a plurality of print servers 10 in the LAN 40. As shown in FIG. 8, each print server 10 is set up on the setup screen 60 displayed on the display device 34. In particular, the setup screen 60 contains a text box 61 that is for IP address input, a text box 62 that is for subnet mask input, a text box 63 that is for default gateway input, a text box 64 that is for host name input, and a checkbox 65 that is for on/off control of a self signature function, and a checkbox 66 for on/off control of a certificate issuance. Here, a checkbox 65 that is for on/off control of a self signature function is a check box to activate a function to generate a server's own server certificate 10c (electronically signed with the CA private key in a server 18p). A checkbox 66 that is for on/off control of a certificate issuance function is a check box to activate a function to generate a server certificate 10c (electronically sign with the CA private key in a server 18p) of another print server 10. Then, in the network print system, the administration PC 30 set up the print server 10 based on information input by the user with the setup screen 60. That is, the administration PC 30 transmits the information with the setup screen 60 to the print server 10, and the print server 10 sets up itself based on the information received from the administration PC 30. Thus, it is possible that the administration PC 30 manages a plurality of the print servers 10.

If IP address or host name that is identification information of a print server 10 is changed with the setup screen 60, the administration PC 30 transmits an identification information change request to request for changing identification information (in particular, host name change request or IP address change request) to the print server 10 of which identification information to be changed (hereinafter referred to the "first print server" for convenience of explanation) as shown in FIG. 7

When the first print server 10 receives an identification change request from the administration PC 30, the first print server 10 executes a process to update the server's own server certificate 10c. Specifically, if a function to generate an own server certificate 10c (self signature function) is set "on" on the setup screen 60 (in the case that a check box 65 that is for "on/off" control of a self signature function is already set "on"), the first print server 10 generates the server's own server certificate 10c electronically signed with the CA private key in a server 18p the generated new server certificate 10c is set as the own server certificate 10 of the print server instead of a old server certificate 10c (update a server certificate 10c). On the other hand, if a function to generate an own server certificate 10c (self signature function) is set "off" on the setup screen 60 (in the case that a check box 65 that is for "on/off" control of a self signature function is already set "off"), the first print server 10 executes the following processes.

That is, the first print server 10 executes broadcast for signable server search for searching a print server 10 in the LAN 40 which can generate a server certificate 10 of other print server 10, i.e., a function to generate a server certificate 10c of other print server is set "on" on the setup screen 60 (in the case that a check box 66 that is for "on/off" control of a certificate issuance function is already set "on"), and the server certificate 10c is valid. Correspondingly, the print server 10 in the LAN 40 makes a response whether the print server 10 itself is possible to generate a server certificate 10c of other print server 10.

The first print server 10 transmits a SSL communication request to one of the print servers 10 which responded as being capable of generating a server certificate 10c of other print server 10 (hereinafter referred to the "second print server for convenience of explanation"). Thus, SSL handshake is executed between the first print server 10 and the second print server 10. In the SSL handshake, the first print server 10 receives the server certificate 10c from the second print server 10 and searches for a CA certificate which can be used to verify the server certificate 10c among CA certificates 19c of the signable print servers 10 stored in the storage unit 28 based on a signer information of the received serer certificate 10c. A confirm process of the identity of the second print server 10 by verifying the electronic signature of the server certificate 10c using the CA certificate 19c is executed. A process of establishing the SSL connection is executed sharing a common key by an encryption communication using the server certificate 10c (in particular, the server public key). Then, the first print server 10 creates a CSR (Certificate Signing Request). Here, a CSR is a request message in order to issue a public key certificate (certificate signing request). In the network print system of the example, as can be seen in format example shown in FIG. 9, a CSR contains holder information, a public key, an expansion region and an electronic signature (digital signature). An actual CSR is not text data, in FIG. 9, it is sown in text for convenience of explanation.

Then, the first print server 10 transmits a signature request that requests for generating a server certificate 10c (electronic signature) to the second print server 10, and transmits further the generated CSR. Here, the CSR is carried on from the contents of the server certificate that the first print server hold at this time. The common name is identification information of the updated certificate. A CSR used in the example (see FIG. 9)_does not contain validity period related items of the server certificate 10c, the first print server 10 transmit validity period information indicating a validity period of the server certificate 10c to be requested for generation in addition to a CSR. In the example, the validity period is indicated to be one year after the issuance of the certificate.

If the second print server 10 receives the signature request and CSR from the first print server 10, based on the received CSR, the second print server 10 generates a server certificate 10c of the first print server 10 electronically signed with the CA private key in a server 18p, and transmits the certificates to the first print server 10

If the first print server 10 receives the server certificate 10c from the second print server 10, by installing the received server certificate 10c, the received new server certificate 10c is set as the server certificate 10 of the print server instead of a old server certificate 10c (update a server certificate 10c).

Thereafter, the first print server 10 transmits a SSL disconnect request to the second print server 10. Herewith, the SSL connection between the first print server 10 and the second print server 10 is disconnected.

4. Processes Executed by Print Server

Processes executed by a print server 10 and an administration PC 20 to realize the above described communication are explained.

4.1 Main Server Process

Firstly, referring to a flow chart shown in FIG. 10, a server main process executed by the CPU 11 of the print server 10 is described.

When the server main process starts, the CPU 11 waits until the CPU receives one of various requests. If the CPU receives a request, the CPU goes to S102. At S102, it is determined whether the received request at S101 is the transmit data of broadcast for signable server search. Here, broadcast for signable server search is transmitted at S501 in an alternative signing request process executed by the CPU 11 of the other print server 10 which is described later (see FIG. 14).

Then, if it is determined that the transmit data of broadcast for signable server search is received at S102, the CPU 11 goes to S103, and after the signable response process is executed, the CUP 11 goes back to S101. The details of the signable response process are described later (see FIG. 11).

On the other hand, if the received data is not determined to be the transmit data of broadcast for signable server search, the CPU 11 goes to S104, and it is determined whether the received request at S101 is a signature request. Here, the signature request is transmitted at S505 in an alternative signing request process executed by the CPU 11 of the other print server 10 which is described later (see FIG. 14).

Then, if it is determined whether the received request at S101 is a signature request at S104, the CPU 11 goes to S105, and after a certificate signature process that generates a server certificate of 10c of the print server 10 from which the signature request is transmitted is executed, the CPU 11 goes back to S101. Details of the certificate signature process are described later (see FIG. 12).

On the other hand, if it is determined that the signature request is received at S104 is not a signature request, the CPU 11 goes to S106, and it is determined whether the request received at S101 is a notification of the IP address assigned by the DHCP (Dynamic Host Configuration Protocol).

Then, if it is determined that the received request is the notification of the IP address assigned by the DHCP, the CPU goes to S107, and after the host name/IP address change process due to the change of host name or IP address is executed, the CPU goes back to S101. The details of the host name/IP address change process are described later (see FIG. 13).

On the other hand, if it is determined that the received request is not the notification of the IP address assigned by the DHCP, the CUP 11 goes to S108, and it is determined whether the received request is the IP address change request from the administration PC 30.

Then, if it is determined that the received request is the IP address change request at S108, the CPU 11 goes to S107. After the host name/IP address change process is executed, the CPU 11 goes back to S101.

On the other hand, if it is determined that the received request is not the IP address change request at S108, the CUP 11 goes to S109, it is determined whether the request received at S101 is a host name change request from the administration PC 30.

Then, if it is determined that the received request is a host name change request at S109, the CPU 11 goes to S107. After the host name/IP address change process is executed, the CPU 11 goes back to S101.

On the other hand, if it is determined that the received request is not a host name change request, the CUP 11 goes to S110, and it is determined whether the request received at S101 is a SSL communication request. Here, the SSL communication request is transmitted at S504 in a signature request process executed by a CPU 11 of the other print server 10 which is described later (see FIG. 14).

Then, if it is determined that a SSL communication request is received at S114, the CPU 11 goes to S111, a process to start SSL communication is executed. Thereafter, the CPU 11 goes back to S101.

On the other hand, if at S110 it is determined that the received request is not a SSL communication request, the CPU 11 goes to S112, and it is determined whether the request received at S101 is a SSL disconnect request. Here, the SSL communication request is transmitted at S509, etc., in a signature request process executed by a CPU 11 of the other print server 10 which is described later (see FIG. 14).

Then, if it is determined that a SSL disconnect request is received at S112, the CPU 11 goes to S127, and a process to disconnect a SSL connection is executed. Thus, the SSL connection is disconnected. Thereafter, the CPU 11 goes back to S101.

On the other hand, if at S112 it is determined that the received request is not a SSL disconnect request, the CPU 11 goes to S114, and it is determined whether the received request is a print request from the client PC 20.

Then, if it is determined that the print request is received at S114, the CPU 11 goes to S115, and after the print process which prints images represented by print data image is executed, the CPU goes back to S101. The details of the print process are described later (see FIG. 15).

On the other hand, if it is determined that the print request is not received at S114, the CPU 11 goes to S116, the other processes (SSL handshake process, etc.) are executed. Thereafter, the CPU 11 goes back to S101.

4.2 Signable Response Process

Next, referring to a flow chart shown in FIG. 11, a signable response process which is executed at S103 in the above described server main process (see FIG. 10) is described.

When the signable response process starts, firstly, it is determined whether a server certificate 10c of other print server 10 can be generated (electronically signable) at S201. Specifically, it is determined that a server certificate 10c of other print server 10 can be generated, if a function to generate a server certificate 10c of other print server 10 is set "on" on the setup screen 60 displayed on the display device 24 of the administration PC 30 (see FIG. 8), (in the case that a check box 66 that is for "on/off" control of a certificate issuance function is already set "on"), and the server certificate 10c of itself is valid.

Then, if it is determined whether a server certificate 10c of other print server 10 can be generated at S201, the CPU 11 goes to S202, and return response data that a server certificate 10c of other print server 10 can be generated. Thereafter, the signable response process is terminated.

On the other hand, if it is determined whether a server certificate 10c of other print server 10 cannot be generated at S201, the CPU 11 goes to S203, and return response data that a server certificate 10c of other print server 10 cannot be generated. Thereafter, the signable response process is terminated.

4.3 Certificate Signature Process

Next, referring to a flow chart shown in FIG. 17, a certificate signature process which is executed at S119 in the above described server main process (see FIG. 13) is described.

When the certificate signature process starts, firstly, a process to receive CSR and validity period information is executed at S301. Here, the CSR and the validity period information are transmitted at S506 and S507 in the signature request process executed by the CPU 11 of the print server 10 from which the signature request is transmitted (see FIG. 14).

Next, at S302, a server certificate 10c is generated electronically signed with the CA private key in a server 18p based on the CSR and the validity period information received at S301.

Then, at S303, the server certificate 10c generated at S302 is transmitted to the print server 10 from which the signature request is transmitted. Thereafter, the certificate signature process is terminated.

4.4 Host Name/IP Address Change Process

Next, referring to a flow chart shown in FIG. 13, a host name/IP address change process which is executed at S107 in the above described server main process (see FIG. 10) is described.

When the host name/IP address change process starts, firstly, at S401, a content of the own server certificate 10c is referred.

Next, at S402, it is determined whether the identification information to be changed (host name or IP address) is used as a common name (holder information) in the own server certificate 10c referred at S401. That is, it is determined whether the server certificate 10c cannot be used (revoked) after the identification information is changed.

Then, if it is determined that the identification information to be changed is used as a common name at S402 (specifically, if the host name is determined to be used as a common name in the case that the host name is changed, or if the IP address is determined to be used as a common name in the case that the IP address is changed), the CPU 11 goes to S403, and the own server private key 10p and the own server public key are newly generated.

Next, a CSR is created at S404. Here, the created CSR is carried on from contents of the server certificate 10c currently held. The common name is the updated identification information. Specifically, the common name is a new host name if the host name is changed, and the common name is a new IP address if the IP address is changed. In addition, the server public key is newly generated.

Next, at S405, it is determined whether a function to generate an own server certificate 10c (self signature function) is set "on" on the setup screen 60 (in the case that a checkbox 65 that is for "on/off" control of a self signature function is already set "on").

Then, if at S405, it is determined that a function to generate an own server certificate 10c (self signature function) is set "on", the CPU 11 goes S406, the own server certificate 10c electronically signed with the CA private key in a server 18p is generated based on the CSR created at S404. Thereafter, the CPU 11 goes to S409. Here, the validity period is carried on from the contents of the old server certificate.

On the other hand, if at S405, it is determined that a function to generate an own server certificate 10c (self signature function) is set "off", the CPU 11 goes to S407, and a signature request process which requests other print server 10 in the LAN 50 to generate a server certificate 10c (electronic signature) is executed. The details of the signature request process are described later (see FIG. 14).

Next, at S408, it is determined whether by the signature request process at S407, the signature is successfully executed (whether other print server 10 generates the server certificate 10c).

Then, if it is determined that the signature is not successfully done at S408 (failed), the host name/IP address change process is terminated. Optionally, in such a case, a notification that a host name or an IP address is not possible to be changed (that is, the server certificate 10c cannot be updated) may be transmitted to the administration PC 30.

On the other hand, if it is determined that the signature is successfully done, the CPU goes to S409.

At S409, by installing the server certificate 10c (the generated server_certificate_10c at S406, or the received server certificate 10c in the signature request process at S407), the new server certificate 10c is set as the own server certificate 10 instead of an old server certificate 10c. That is, the server certificate 10c is updated. Thereafter, the CPU 11 goes to S410.

On the other hand, if it is determined that the identification information to be changed is not used as a common name at S402 (namely, in the case that the server certificate 10c does not need to be updated), the CPU 11 goes directly to S410.

Then, at 410, the own host name or IP address is changed to the host name or IP address designated by the notification from the DHCP, the IP address change request, or the host name change request. Thereafter, the host name/IP address change process is terminated.

4.5 Alternative Signing Request Process

Next, referring to a flow chart shown in FIG. 14, a signature request process which is executed at S407 in the above described host name/IP address change process (see FIG. 13) is described When the signature request process starts, firstly, the broadcast for signable server search is executed to search for a print server 10 in the LAN 50 which can generate a server certificate 10c of other print server 10 (electronically signable).

Next, at S502, a process to receive data returned as a response of the broadcast for signable server search at S501. Here, the response data is transmitted at S103 in the above described server main process executed by a CPU of the other print server in the LAN 50 (specifically, at S202, S203 in FIG. 11).

Next, at S503, it is determined whether there exists a print server in the LAN 50 which can generate a server certificate 10c of other print server 10 (electronically signable), based on the data received at S502.

Then, if it is determined that there does not exist a print server in the LAN 50 which can generate a server certificate 11c of other print server 10 (electronically signable print server) at S503, the signature request process is terminated as a failure of the signature. As a result, it is determined that the signature is failed (S408: NO) at S408 in the above described host name/IP address change process (see FIG. 13).

On the other hand, it is determined that there exists a print server in the LAN 50 which can generate a server certificate 11c of other print server 10 (electronically signable print server) at S503, the CPU 11 goes to S504, and the SSL communication request is transmitted to one of such print servers 10. Thus, SSL handshake is executed between the first print server 10 from which the SSL communication request is transmitted and the second print server 10 which receives the SSL communication request. In the SSL handshake, the first print server 10 receives a server certificate 10c from the second print server 10 and searches for a CA certificate which can be used to verify the server certificate 10c among CA certificates 19c of the signable print servers 10 stored in the storage unit 28 based on a signer information of the received serer certificate 11c. A confirm process of the identity of the second print server 10 by verifying an electronic signature of the server certificate 10c using the CA certificate 19c is executed. A process of establishing the SSL connection is executed sharing a common key by an encryption communication using the server certificate 10c (in particular, the server public key). Next, a signature request is transmitted to the print server with which the SSL connection is established at S505.

Next, the CSR created at S404 in the host name/IP address change process (see FIG. 13) is transmitted to the print server 10 at S506. Then, validity period information indicating a validity period of a server certificate 10c to be requested for generation (1 year after the issuance in the example) is transmitted to the print server 10 at S507.

Next, at S508, a process to receive a server certificate 10c transmitted from the print server 10 corresponding to the signature request, the CSR and the validity period information transmitted at S505-S507. Here, the server certificate 10c is transmitted at S105 in the server main process (see FIG. 10) executed by the CPU 11 of the print server 10 from which the signature request, etc. are transmitted (specifically, at S303 in FIG. 12).

Next, a SSL disconnect request is transmitted at S509. Thus, the SSL connection is disconnected. Thereafter, the signature request process is terminated as a success of the signature. As a result, it is determined that the signature is successfully done (S408: YES) in the above described IP address change process (see FIG. 13).

4.6 Print Process

Referring to a flow chart shown in FIG. 15, a print process which is executed at S115 in the above described server main process (see FIG. 10) is described.

When the print process starts, firstly, a process to receive print data from the client PC 20 at S601. Next, at S602, images represented by the print data received at S601 are printed. Thereafter, the print process is terminated. Here, because the print data is encrypted by the common key during SSL communication, the received print data is decrypted and the images represented by the print data are printed.

5. Effect of the Example

As described above, the network print system of the example, if the print server 10 detects that the own identification information (IP address or host name) is to be changed (S106: YES, S108: YES, S109: YES), the own server certificate 10c is generated by an electronic signature using the CA private key in a server 18p (8406). Therefore, in the network print system, in the case that the identification information of the print server 10 is changed, the update of the server certificate 10c of the print server 10 is executed within the print server 10. The network traffic can be reduced compared with the configuration that issuance of the server certificate 10c is requested to other device.

Particularly, in the network print system of the example, since each of the plurality of print servers 10 has a function as a CA, negative effects of malfunction of the devices, etc., can be reduced. That is, if it is configured that only one specific CA issues server certificates 10c of all of a plurality of print servers 10, and the CA cannot be used (for example, the CA is cracked and is down), issuance of the server certificate 10c cannot be done for any print server 10. On the other hands, in the network print system according to the example, even if one of the print servers 10 cannot be used, other print server 10 can issue the server certificate 10c, and a highly reliable system can be achieved.

Further, in the network print system of the example, since an administrator, etc., set up whether a function to generate an own server certificate 10c (self signature function) is set "on" (see FIG. 8), automatic update of the server certificate 10c within the print server 10 may be set to be prohibited depending upon the situation.

Still further, in the network print system according to the example, if the self signature function is off and the identification information is changed (S405: NO), the print server 10 requests other print server 10 to generate the server certificate 10c (electronic signature) (S407). Therefore, the network print system can prevent the situation where the server certificate 10c continues to be revoked due to the identification information change for a long time.

6. Other Examples

In the above, the examples of the present invention have been described. An example of the invention is not limited to the above examples. According to the claims of the invention, various examples may be realized.

In the network print system of the example, the server certificate 10c is automatically updated. However, the server certificate 10c may be updated in other way, for example, if the server certificate 10c needs to be updated, confirmation of the administrator is required (for example, using a dialog box displayed on the display device 34 of the administration PC 30), and the update process of the server certificate 10c may be executed depending the confirm result.

What is claimed is:

1. A communication device which executes encryption communication using a public key certificate which attests that a public key corresponds to identification information of the communication device, comprising:

an identification information storing unit configured to store identification information specifying the communication device used for communicating with a device on a network;

a certificate storing unit configured to store a public key certificate which attests to the communication device and includes holder information;

a certificate transmitting unit configured to transmit the public key certificate stored in the certificate storing unit to a terminal device;

a communication unit configured to communicate with the terminal device using the public key certificate at least when it is judged by the terminal device that the holder information included in the public key certificate corresponds to the identification information;

a detect unit configured to detect an instruction for changing identification information of the communication device stored in the identification storing unit through an interface;

a judging unit configured to judge whether a type of the identification information corresponding to the instruction for changing is used as a type of the holder information included in the public key certificate stored in the certificate storing unit when the instruction for changing the identification information is detected by the detect unit;

a certificate generate unit configured to generate a public key certificate, which attests that the public key corresponds to changed identification information of the communication device, with an electronic signature, using a private key that does not match the public key when the judging unit judges that the type of the identification information corresponding to the instruction for changing is used as the type of the holder information included in the public key certificate; and an identification information change unit configured to change the identification information stored in the identification information storing unit to the identification information corresponding to the instruction for changing identification information of the communication device detected by the detect unit, without updating the public key certificate stored in the certificate storing unit, when the judging unit judges that the type of the identification information is not included in the public key certificate, and to change the identification information stored in the identification information storing unit to the identification information corresponding to the instruction for changing identification information of the communication device detected by the detect unit after generating a new public key certificate with the certificate generate unit when the judging unit judges that the type of the identification information is used as the type of the holder information included in the public key certificate.

2. The communication device according to claim 1, further comprising:
   a setup unit that sets up the communication device to prohibit generation of the public key certificate; and
   a prohibit unit that determines whether generation of the public key certificate by the certificate generate unit is to be prohibited based on a setup by the setup unit, and prohibits generation of a public key certificate by the certificate generate unit when the generation is determined to be prohibited.

3. A non-transitory computer-readable medium storing a computer program which causes a computer, when executed, to execute encryption communication using a public key certificate which attests that a public key corresponds to identification information of a communication device, the computer program causing the computer to configure as:
   an identification information storing unit configured to store identification information specifying the communication device used for communicating with a device on a network;
   a certificate storing unit configured to store a public key certificate which attests to the communication device and includes holder information;
   a certificate transmitting unit configured to transmit the public key certificate stored in the certificate storing unit to a terminal device;
   a communication unit configured to communicate with the terminal device using the public key certificate at least when it is judged by the terminal device that the holder information included in the public key certificate corresponds to the identification information;
   a detect unit configured to detect an instruction for changing identification information of the communication device stored in the identification storing unit through an interface;
   a judging unit configured to judge whether a type of the identification information corresponding to the instruction for changing is used as a type of the holder information included in the public key certificate stored in the certificate storing unit when the instruction for changing the identification information is detected by the detect unit;
   a certificate generate unit configured to generate a public key certificate, which attests that the public key corresponds to changed identification information of the communication device, with an electronic signature,. using a private key that does not match the public key when the judging unit judges that the type of the identification information corresponding to the instruction for changing is used as the type of the holder information included in the public key certificate; and
   an identification information change unit configured to change the identification information stored in the identification information storing unit to the identification information corresponding to the instruction for changing identification information of the communication device detected by the detect unit, without updating the public key certificate stored in the certificate storing unit, when the judging unit judges that the type of the identification information is not included in the public key certificate, and to change the identification information stored in the identification information storing unit to the identification information corresponding to the instruction for changing identification information of the communication device detected by the detect unit after generating a new public key certificate with the certificate generate unit when the judging unit judges that the type of the identification information is used as the type of the holder information included in the public key certificate.

4. The communication device according to claim 1, wherein identification information, by which the communication device is identified, includes a plurality of pieces of identification information including first identification information and second identification information, the first identification information being identification information related to the public key certificate,
   wherein the certificate generate unit generates the public key certificate which attests that the public key corresponds to changed identification information and the identification information device change unit changes the identification information of the communication device, if the detect unit detects the instruction for changing the first identification information of the communication device, and
   wherein the certificate generate unit does not generate the public key certificate and the identification information device change unit changes the identification information of the communication device, if the detect unit detects the instruction for changing the second identification information of the communication device.

5. The communication device according to claim 2, further comprising:
   a request unit that requests outside for generation of a public key certificate which attests that the public key corresponds to changed identification information, when the detect unit detects a change of the identification information in the case that generation of the public key certificate by the certificate generate unit is prohibited by the prohibit unit.

6. The communication device according to claim 1, wherein the certificate generate unit comprises:
   a first generating unit configured to generate a public key and a private key corresponding to the public key;
   a second generating unit configured to generate a certificate signing request including the newly generated public key, holder information including the changed identification information corresponding to the instruction for changing identification information and other predetermined information, which includes information corresponding to the public key certificate stored in the certificate storing unit; and
   a third generating unit configured to generate a new public key certificate based on the certificate signing request generated by the second generating unit.

7. The non-transitory computer readable medium according to claim 3, wherein identification information, by which the communication device is identified, includes a plurality of pieces of identification information including first identification information and second identification information, the first identification information being identification information related to the public key certificate, wherein the certificate generate unit generates the public key certificate which attests that the public key corresponds to changed identification information and the identification device change unit changes the identification information of the communication device, if the detect unit detects the instruction for changing the first identification information of the communication device, and wherein the certificate generate unit does not generate the public key certificate and the identification information device change unit changes the identification information of the communication device, if the detect unit detects the instruction for changing the second identification information of the communication device.

8. The communication device according to claim 6, wherein the third generating unit generates the public key certificate by transmitting the certificate signing request to a certificate authority and receiving a public key certificate with a digital signature based on the certificate signing request transmitted to the certificate authority, wherein, the certificate generate unit further comprises a certificate updating unit configured to delete the public key certificate stored in the certificate storing unit and store the public key certificate received by the third generating unit in the certificate storing unit when the public key certificate is received by the third generating unit, and not to update the public key certificate stored in the certificate storing unit when the public key certificate is not received by the third generating unit, and wherein the identification information change unit changes the identification information stored in the identification information storing unit to the identification information corresponding to the instruction for changing detected by the detect unit when the public key certificate is updated by the certificate updating unit, and does not change the identification information stored in the identification information storing unit to the identification information corresponding to the instruction for changing detected by the detect unit when the public key certificate is not updated by the certificate updating unit.

9. The communication device according to claim 5, further comprising:

an authentication unit that generates a requested public key certificate when the authentication unit receives an external request to generate the public key certificate.

10. A communication system, comprising:

a communication device according to claim 1; and a terminal device, wherein the terminal device comprises:

a receiving unit configured to receive the public key certificate from the communication device;

an identification information judging unit configured to judge whether holder information included in the public key certificate received by the receiving unit corresponds to identification information specifying the communication device; and a communication unit configured to communicate with the communication device using the public key certificate when the identification information judging unit judges that the holder information included in the public key certificate received by the receiving unit corresponds to the identification information specifying the communication device.

* * * * *